(No Model.)

E. WESTON.
ELECTRICAL CONDUCTOR.

No. 301,031.  Patented June 24, 1884.

Attest:
Raymond F. Barnes.
W. Frisby.

Inventor:
Edward Weston
By Parker W. Page
atty.

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

ELECTRICAL CONDUCTOR.

SPECIFICATION forming part of Letters Patent No. 301,031, dated June 24, 1884.

Application filed February 21, 1884. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Electric Conductors, of which the following is a specification, reference being had to the drawings accompanying and forming a part of the same.

In certain systems for electric lighting or similar purposes it is necessary to employ two or more parallel conductors in parts of the system. For example, in a multiple-series system of incandescent lighting invented by me one and sometimes two conductors are run in addition to the mains or current-supplying conductors to each lamp, the current to be carried by such additional conductors being, however, very small. The wires used are quite fine. With the object of avoiding the difficulties of running or supporting several wires of this kind, I have devised a form of cable which combines in one casing all the wires required.

Figure 1:
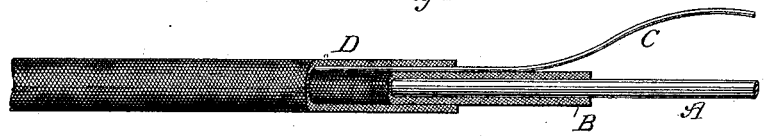
Figure 2:
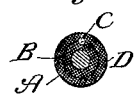
Figure 3:

The invention is illustrated in the accompanying drawings, in which Figure 1 is a view in elevation of a portion of my improved cable with parts of the insulation removed. Fig. 2 is a section of cable with one extra wire; Fig. 3, a section of a cable containing two such wires.

I have illustrated the cable in the most practicable form of which I am aware.

A is the main wire, such as is commonly used for electric lighting purposes; B, a fibrous insulating-jacket surrounding the same. C is a fine uninsulated wire laid along the jacket B, and D is a second or outer jacket similar to that designated by the letter B and inclosing both conductors. The jacket B is applied to the wire A by any form of braiding-machine. The wire A, thus insulated, is then passed through a second braiding-machine together with the fine wire C, and the outer jacket, D, put on.

In lieu of one wire C, two may be used when necessary, as shown in Fig. 3. Other means of insulating the wires or constructing the cables may be employed, if so desired.

A conductor thus made is run as any other from the main wires of a circuit or from a machine to the lamps or other devices to be supplied with current. At each lamp the outer jacket or coating is stripped off, and the fine wire or wires exposed and connected to the proper devices.

I am aware that cables have heretofore been constructed with two or more central conductors to be used either as a round-wire circuit or as independent circuits. I am also aware that the conducting jackets, sheathings, and casings of cables have also been used in a similar manner; but in all cases, so far as I am aware, the capacity of the several circuits has been at least equal, or the additional conductors have had some special and independent function—such as strengthening the cable or preventing induction, and they have been constructed with special reference thereto. My invention differs from these, however, in that it consists of a wire much finer than the main conductor, which is simply bound up by the insulating-jackets, substantially parallel to the main wire.

What I claim is—

1. The combination, with an electrical conductor and insulating jackets or coverings for the same, of one or more finer wires laid substantially parallel to the main wire and between the insulating-jackets, as and for the purpose specified.

2. The combination, with the central wire, A, and jackets or coatings B D, of the fine wire C between the jackets B and D, substantially parallel to the central wire, as set forth.

In testimony whereof I have hereunto set my hand this 6th day of February, 1884.

EDWARD WESTON.

Witnesses:
HENRY A. BECKMEYER,
JOHN C. YOUNG.